3,463,480
SPACING AND HOLDING DEVICE FOR SIDING
Lloyd V. Edstrom, N. 5515 Fleming St.,
Spokane, Wash. 99208
Filed Nov. 17, 1966, Ser. No. 595,110
Int. Cl. B23q 3/00; G01b 3/30
U.S. Cl. 269—309                              2 Claims

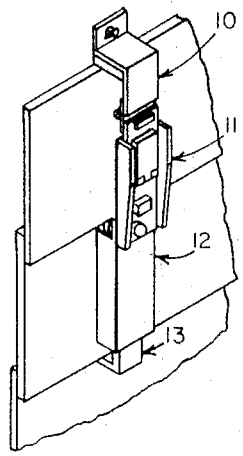
Figure 1
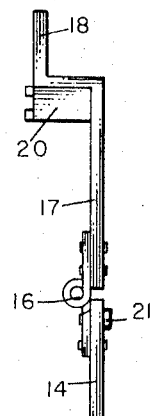
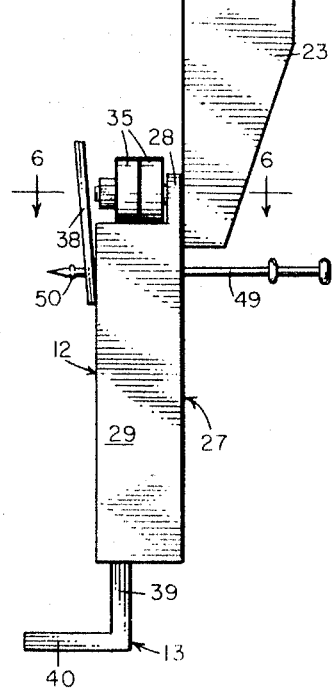
Figure 2
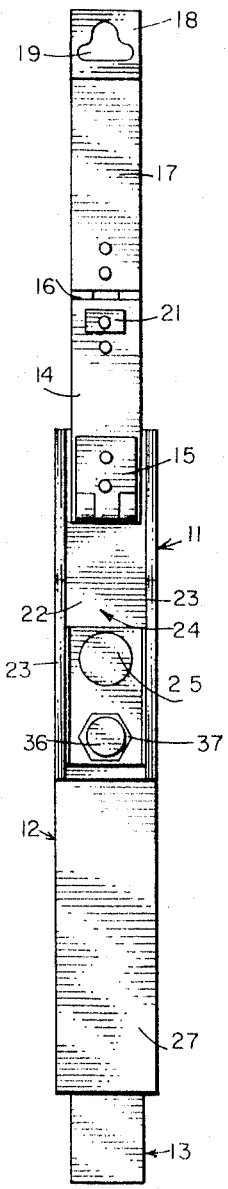
Figure 3
Figure 4
LLOYD V. EDSTROM INVENTOR.
BY *[signature]*
ATTORNEY Aug. 26, 1969
L. V. EDSTROM
3,463,480
SPACING AND HOLDING DEVICE FOR SIDING
Filed Nov. 17, 1966
2 Sheets-Sheet 2
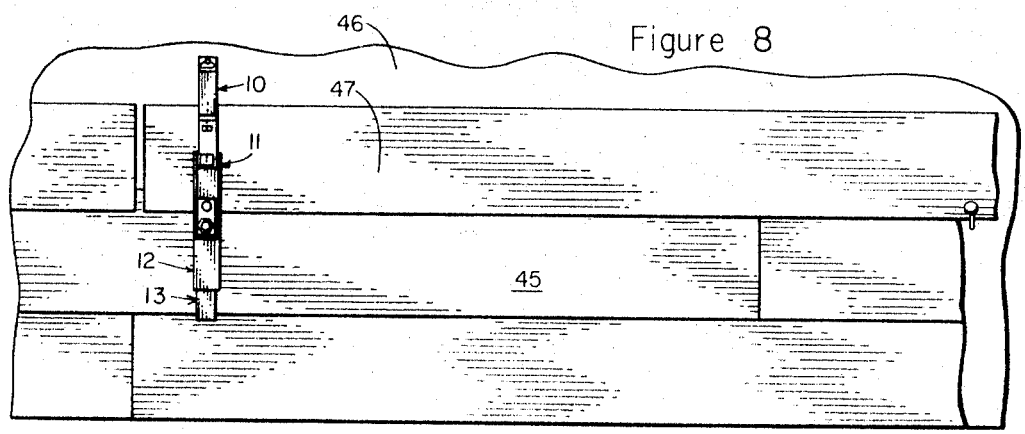
Figure 8
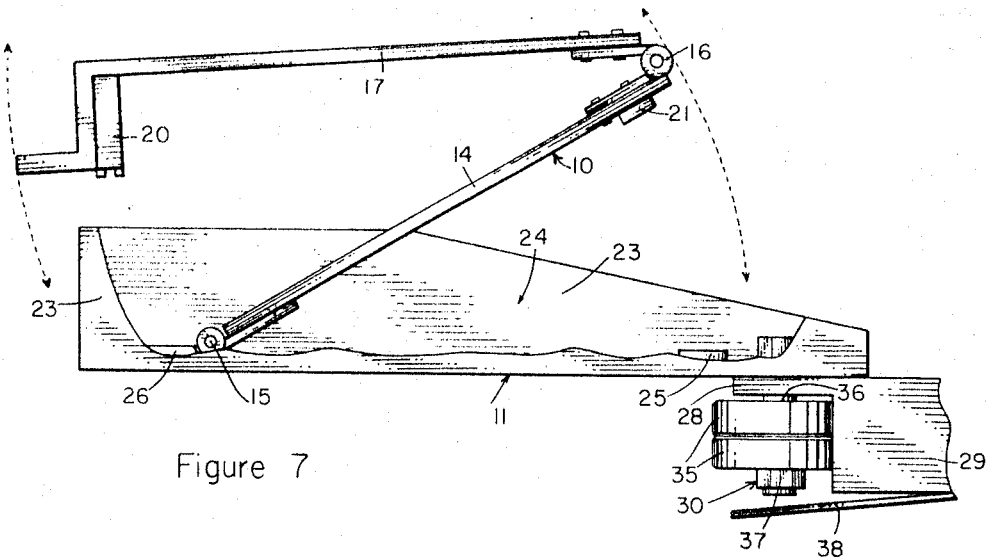
Figure 7
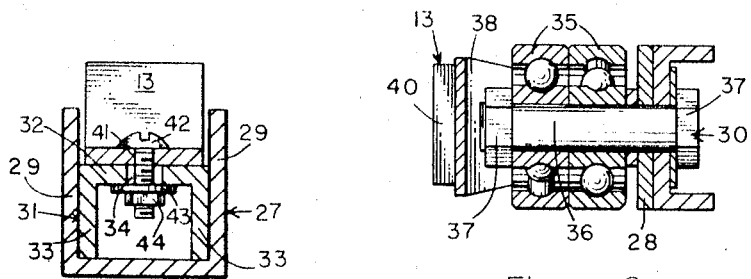
Figure 5  Figure 6
LLOYD V. EDSTROM, INVENTOR.
BY
ATTORNEY

United States Patent Office 3,463,480
Patented Aug. 26, 1969

ABSTRACT OF THE DISCLOSURE

A tool, to space upper sliding boards by reference to lower positioned boards, having a body with roller means for supporting the lower surface of a siding board to be placed, with an adjustably depending spacing arm contacting a lower placed board and a hingably upper fastening arm releasably fastenable on a wall above the board being placed and joined to the body so as to fold therein.

My invention relates generally to a tool to aid in the application of siding in light-frame construction, and more particularly to such a tool to provide for uniform spacing of boards of differing widths and to support one end of a siding member to permit application of long boards by one applicator.

Horizontal siding of an elongate nature and usually beveled configuration has become common for external surfaces in light-frame construction. Siding members are normally applied by nailing or similar fastening to some appropriate understructure. The siding members are normally of a length of several feet, and since they must be properly positioned during the fastening operation, the difficulty of handling usually requires the services of two persons. Normally, also, some auxiliary tool must be used to space the various siding members in uniform fashion.

With these thoughts in mind the instant invention was conceived to provide a supporting and spacing device to aid in side application by one workman. In so doing it is:

A principal object of my invention to provide a new and novel tool that may be used to aid in uniformly spacing siding and at the same time supporting one end of an elongate siding member in proper application position.

A further object of my invention to provide a tool of the nature aforesaid that rollably supports a siding member for lateral motion and in no way mars or otherwise disfigures the member supported and spaced thereby.

A still further object of my invention to provide such a tool that is of a folding nature so that it may be more compactly stored and carried.

A still further object of my invention to provide such a tool that is readily adjustable to various spacings and various sizings of siding.

A further object of my invention to provide such a tool as aforesaid that is of simple and economic manufacture, of rugged and durable nature, of new and novel design and otherwise well suited to the uses and purposes for which it is intended.

These and other objects of my invention will become apparent from consideration of the following specification and accompanying drawings. In carrying out the objects of my invention, however, it is to be understood that its essential features are susceptible of change in design, ordering and structural arrangement, with only one preferred practical embodiment being illustrated, as required.

In the accompanying drawings, wherein like numbers of reference refer to similar parts throughout:

FIGURE 1 is an isometric view of my tool in place on a wall, supporting and spacing the siding member positioned therein.

FIGURE 2 is a vertical orthographic side view of my tool showing its parts, their configuration and relationship.

FIGURE 3 is a vertical orthographic front view of the tool illustrated in FIGURE 2, showing its various elements from this aspect.

FIGURE 4 is a vertical orthographic back view, partially cutaway, showing particularly the adjustable means of fastening the spacing member to the body portion of my tool.

FIGURE 5 is a horizontal cross-sectional view of the invention illustrated in FIGURE 4, taken on the line 5—5 in the direction indicated by the arrows thereon.

FIGURE 6 is a horizontal cross-sectional view through the roller member of my invention, taken on the line 6—6 of FIGURE 2, in the direction indicated by the arrows thereon.

FIGURE 7 is a partially cutaway, orthographic side view of the fastening arm of my invention showing, particularly, how it folds into the body member.

FIGURE 8 is a vertical orthographic front view of my invention in place on a wall showing particularly the method of its use.

Referring now to the drawings in more detail, and particularly to that of FIGURE 1, it will be seen that my invention comprises essentially, foldable fastening arm 10 communicating with upper body portion 11 which in turn structurally communicates with lower body portion 12, adjustably carrying spacing arm 13.

Upper fastening arm 10 is a composite hingably communicating member adapted to fold within upper body 11. Lower portion 14 of the fastening arm pivotally communicates by hinge 15 with upper body 11 at one end and at the opposite end communicates by hinge 16 with upper portion 17. The uppermost extension 18 of upper portion 17 is offset inwardly to substantially the vertical plane of the siding supporting rollers and carries supporting-nail hole 19 in its medial part. Preferably magnet 20 is provided on the underside of this horizontal offset to cooperate in maintaining the fastening arm in a folded position. If the fastening arm member be formed from magnetically nonpermeable material, a magnetically permeable member 26 is provided on the forward surface of the upper part of lower portion 14 to further aid in this endeavor.

Upper body 11 is a channel-like member having back 22 and similar opposed sides 23 structurally joined thereby. The configuration of this member is such that upper foldable fastening arm 10 may be folded within the channel 24 between sides 23 as illustrated in FIGURE 7. A magnet 25 is provided in the lower part of the forward face of back 22 to cooperate with the magnetically permeable plate 21 of fastening arm 10 to hold the fastening arm in folded position, and magneticaly permeable plate 26 is provided in the upper part of this member to cooperate with magnet 20 for the same purpose.

With this structure then upper fastening arm 10 may be pivotably folded so that the lower portion 14 will be immediately adjacent back 22 of upper body 11 and upper portion 17 will be folded immediately thereover. Each of these members will be magnetically held in this position but manually releasable therefrom for use.

Lower body portion 12 includes U-shaped elongate channel 27, with the body portion 28 of the U extending upwardly slightly further than the sides 29, to form roller support 30 and provide structural communication with body 11. Opposed L-shaped channels 31 are positioned with their legs 33 structurally communicating with sides 29 of channel body 27 and legs 32 opposed as illustrated in FIGURE 4 to form channel 34 therebetween, for adjustable support of spacing arm 13.

Paired siding supporting rollers 35 are rotatably journaled on stud shaft 36 communicating from the juncture of uper body 11 and lower body 12 perpendicularly rearward. These rollers 35 are preferably ball-bearing, as illustrated in FIGURE 6, and are maintained laterally on shaft 36 by nut 37 threadedly engaged with the inwardly extending end portion thereof. Rearward siding support 38 communicates structurally with lower body 12 and projects upward somewhat above the horizontal plane of the top of rollers 35, to aid in preventing a siding member supported by said rollers from passing rearwardly therefrom; preferably this member is of a somewhat elastic nature.

Below the roller structure, holes 48 are provided in body 28 of channel 27 and in siding support 38 to slideably receive two-headed fastening nail 49. Preferably the nail is maintained in position by protuberance 50 formed after placement. A loosely fitting holding plate 51 may also be provided to slideably fit about the shank of nail 49 and within the channel 27 to somewhat limit motion of the nail for easier handling.

Arm 13 is an elongate band-like, L-shaped member having vertical fastening arm 39 and normally horizontal, somewhat shorter, engaging arm 40. Dimensioning of this spacing arm is such as to allow it fit within channel 27 between sides 29 of lower body 12 immediately inwardly adjacent the rearward surface of legs 32 of members 31, as illustrated in FIGURES 4 and 5. Hole 41 is provided to allow passage of bolt 42, extending through spacing arm 13, through channel 34 between legs 32, and through washer 43 to threadedly engage nut 44 on the other side of legs 32. The structure provides adjustable communication of spacing arm 13 with lower body portion 12 by means of adjustable frictional engagement between the members in response to condition of bolt-nut combination 42, 44.

From the structure of my invention described, its operation can be understood.

Siding, because of its overlapping nature, is normally established in place from the lowermost board upwardly. In using my invention this lowermost board is established in proper position according to methods heretofore used. My tool is then adjusted with appropriate consideration being given to the amount of exposed surface of siding and its particular width, and the spacing arm 13 set relative lower body portion 12 by nut-bolt combination 42, 44 so that the distance between the upper surface of horizontal arm 40 and the upper surface of rollers 35 is identically the vertical component of the exposure desired for that particular siding member. With the tool in this state, the approximate position of one end of the next board 47 to be applied is determined and the horizontal siding engaging arm 40 enaged underneath the siding board 45 in place. In this condition the upper folding arm is extended to its upwardmost extension and a nail or some similar fastener inserted through hole 19 and into the structure 46 supporting the siding to releasably maintain my tool in this position. If desired and permitted by the particular dimensionings, nail 49 may be used to fasten the tool, and in this event the folding arm need not be extended.

The board to be placed 47 then is inserted lengthwise on top of rollers 35 and moved laterally to proper position. In this condition one end of such board will be held by my tool while the other end may be applied to the structure by nailing or otherwise fastening. If desired, obviously, two such tools could be used to maintain both ends of a board during the placement operation.

From the foregoing it is to be noted particularly that my invention may be used to space and hold siding of any dimension and any particular exposure.

It is further to be noted that the tool when used as specified will not mar or disfigure siding operated on by it, but such siding may freely move laterally over the roller supports.

It is to be understood that the foregoing description is necessarily of a detailed specific character so that a specific embodiment of my invention might be set forth as required, but it is to be understood that various modifications, changes, rearrangement and substitution of parts may be resorted to without departing from the spirit, essence or scope of my invention.

Having thusly described my invention, what I desire to protect by Letters Patent, and, what I claim is:

1. A tool of the nature aforesaid for spacing and holding elongate siding boards comprising, in combination:

a body having medial roller means for supporting the lower surface of a siding element in laterally moveable fashion, and means to aid in maintaining the siding element thereon, comprising an upwardly extending support projecting slightly above a horizontal plane through the upper surface of the roller means on the wall facing side thereof;

a compound upper fastening arm hingeably joined to fold within the body and having means of releasably maintaining the fastening arm in a folded position, hingeably communicating with the upper portion of the body and extending upwardly therefrom with means to aid fastening of the fastening arm on an adjacent structure; and a downwardly extending spacing arm adjustably carried by the lower portion of the body and having means of engaging a downwardly adjacent board to vertically position the body relative to the downwardly adjacent board.

2. The invention of claim 1 further characterized by:

a fastening nail slidably extending through the medial part of the body member, with means of maintaining the nail in slideable engagement with the body, the nail being adapted to fasten the body on a rearwardly adjacent structure.

References Cited

UNITED STATES PATENTS

| | | | |
|---|---|---|---|
| 248,460 | 10/1881 | Harris | 33—187 X |
| 467,005 | 1/1892 | Haffner | 33—187 |
| 774,114 | 11/1904 | Spear | 33—187 X |
| 2,216,701 | 10/1940 | Cole | 269—43 X |

ROBERT C. RIORDON, Primary Examiner

J. F. McKEOWN, Assistant Examiner

U.S. Cl. X.R.

33—187